United States Patent Office 3,746,690
Patented July 17, 1973

3,746,690
PROCESS FOR THE MANUFACTURE OF REDISPERSIBLE HYDROPHOBIC STARCH DERIVATIVES
Jan Lolkema, Hoogezand, Netherlands, assignor to Scholten-Honig Research N.V., Foxhol, Netherlands
No Drawing. Filed July 9, 1971, Ser. No. 161,924
Claims priority, application Great Britain, July 14, 1970, 33,993/70
Int. Cl. C08g 22/04
U.S. Cl. 260—77.5 AS                          4 Claims

ABSTRACT OF THE DISCLOSURE

An aqueous suspension of subgranule particles of a water-insoluble hydrophobic starch derivative having a degree of substitution of 0.1 to 1.0 is heated and simultaneously dried in less than 60 seconds at a product temperature of between about 60° and 180° C., and the dry product is comminuted to produce a flaked or powdered, dry hydrophobic starch derivative which is redispersible in water at temperatures below 100° C. to form a stable colloidal suspension of subgranule hydrophobic starch particles.

---

This invention relates to improvements in hydrophobic starch derivatives. The invention is more particularly directed to a process for the manufacture of dry hydrophobic starch derivatives which can be redispersed in water to form a stable colloidal suspension of subgranule hydrophobic starch particles and to the dry hydrophobic starch derivatives obtained by this process.

In the patent literature granular starch ethers containing ether-linked hydrophobic aliphatic or arylaliphate substituents have been described. When the degree of substitution (DS) of the hydrophobic ether groups lies in the range of 0.09 to 0.50, these granular starch ethers cannot be dispersed in water by cooking at 100° C. In order to disperse these starch granules in water it is necessary to cook the starch ether in water at a temperature in excess of 100° C. and then suddenly flashing the water to the atmosphere. This means that for the process of dispersing these hydrophobic starch ethers in water a continuous pressure cooker capable of cooking starch suspensions at super atmospheric pressure is needed. The fact that special equipment, i.e. a continuous pressure cooker, is needed for the dispersion of these granular hydrophobic starch ethers in water means a definite drawback. A continuous cooker is a relatively expensive equipment and requires the availability of high pressure steam. This implies that in many mills the requirements for dispersing granular hydrophobic starch ethers cannot be met. It has been desired, therefore, to produce a hydrophobic starch derivative, which can be redispersed in water to form a stable colloidal suspension of hydrophbic subgranule starch particles using ordinary equipment and temperature.

The suspensions obtained by dispersion of the granular hydrophobic starch ether in water in a continuous pressure cooker are capable of forming films. The dried films are water resistant and cannot be redispersed in water. It was to be expected, therefore, that a process in which aqueous suspensions of said hydrophobic starch ethers are dried in the form of a thin layer will yield products which cannot be redispersed in water.

We have surprisingly found that if an aqueous suspension of subgranule particles of a water-insoluble hydrophobic starch derivative having a degree of substitution of 0.1 to 1.0 is heated and simultaneously dried in less than 60 seconds at a product temperature of between about 60° C. and 180° C. and the dry product is comminuted to flakes or powder, a dry hydrophobic starch derivative is obtained which is redispersible in water at temperatures below 100° C., to provide a stable colloidal suspension of subgranule hydrophobic starch particles.

According to the invention we have now found a process for the manufacture of dry hydrophobic starch derivatives which are dispersible in water at a temperature ranging from ambient temperature up to 100° C. to provide a stable colloidal aqueous suspension which comprises dispersing a water-insoluble granular hydrophobic starch derivative having a degree of substitution of 0.1 to 1.0 in water at a concentration of 10% to 50% by weight at temperatures in excess of 100° C. and heating and simultaneously drying the suspension so obtained in less than 60 seconds at a product temperature of between about 60° C. and 180° C. and comminuting the dried product to flakes or powder.

The hydrophobic starch derivative may be a starch ether or starch ester. The hydrophobic substituent group should contain an aliphatic group of at least 3 carbon atoms and up to 17 carbon atoms and/or an alicyclic group of at least 6 carbon atoms and up to 12 carbon atoms and/or an aromatic group of at least 6 carbon atoms and up to 12 carbon atoms.

Etherifying agents which can be used to produce hydrophobic starch ethers are monofunctional aliphatic, alicyclic or aromatic compounds containing an active group which can form an ether link with starch, such as halide or other ester reagents or epoxy reagents or reagents containing a double bond capable of addition reaction, or mixtures thereof. Exemplary of such etherifying reagents are propyl chloride, isopropyl chloride, butyl chloride, amyl chloride, allyl chloride, methallyl chloride, 3-cyclohexenyl chloride, benzyl chloride, p-halobenzyl chloride, o-halobenzyl chloride, dodecylbenzyl chloride or the corresponding bromides or iodides; tributylphosphate; butadiene monoxide, epoxy decane, styrene oxide, cyclohexene oxide, phenylglycidyl ether, allylglycidyl ether, 2-ethylhexylglycidyl ether or the glycidyl ester of versatic acid; acrylonitrile.

Esterifying agents, which may be used to produce hydrophobic starch esters are monofunctional aliphatic, alicyclic, or aromatic compounds containing an active group which can form an ester link with starch such as acid halides, acid anhydrides, vinyl esters and isocyanates or mixtures thereof. Exemplary of such esterifying reagents are lauroyl chloride, stearoyl chloride, benzoyl chloride, benzene sulphonyl chloride, butyric anhydride, caproic anhydride, benzoyl anhydride, vinyl butyrate, vinyl 2-ethylhexoate, vinyl stearate, vinyl benzoate, isopropyl isocyanate, stearyl isocyanate, phenyl isocyanate, o-, m- or p-tolyl isocyanate, naphthyl isocyanate or O-, m- or p-halophenyl isocyanate or tosyl isocyanate.

These reagents are usually reacted in alkaline media with starch preferably with ungelatinized granule starch. Sometimes a small amount of bifunctional or polyfunctional reagent is additionally used. The reaction may be conducted in the dry state or in suitable liquids, such as water, alcohols or ketones. The reagents should be used in such an amount that the degree of substitution of the hydrophobic starch derivatives is in the range of 0.1 to 1.0.

A hydrophobic starch derivative with a DS of 0.10 to 0.35 and with hydrophobic substituents containing at least 6 carbon atoms is preferred. For starch derivatives with hydrophobic substituents with less than 6 carbon atoms a DS varying from 0.36 to 1 is preferable.

The starch from which the hydrophobic derivatives are made may be any known native starch, such as corn starch, waxy maize starch, high amylose maize starch, potato starch, sago starch, wheat starch, tapioca starch and rice starch. Instead of native starches we may use starches modified by acids, oxidants, heat, etherifying agents or esterifying agents, provided said modified starch has substantially maintained its starch character.

The hydrophobic starch derivative is first dispersed in water to form an aqueous colloidal suspension of subgranule sized starch particles. This may be accomplished by heating and fragmenting the starch derivative in water in a continuous pressure cooker or in an autoclave provided with stirrer. The temperature should be in excess of 100° C. and may be as high as 180° C. The suspension thus obtained is heated and simultaneously dried.

In the preferred embodiment of this invention this is accomplished by rapidly drying a suspension in a thin layer on a rotating drying drum, which is heated at a temperature of between about 100° C. and about 180° C. The drum should rotate with at least 1 r.p.m., which means that the drying cycle takes less than 60 seconds. Preferably the drum makes more than 2 r.p.m., while the temperature is being kept in the range of from 120° C. to 150° C. The concentration of the suspension to be dried should be in the order of 10% to 50% by weight on a dry basis. Preferably the fresh suspension which is still warm, is used. The film coming from the drying drum is comminuted to flakes.

It is also possible to spray-dry a colloidal suspension of the subgranule hydrophobic starch particles, preferably directly after its preparation, when it is still warm. The inlet temperature of the drying gas may be from 150° C. to as high as 350° C., but the temperature of the starch product will be in the range of 60° C. to 180° C. In this process the product is obtained in the form of a powder. The drum-drying method is however to be preferred for several reasons. The dry products according to the invention can be redispersed in water by stirring them in water of ambient temperature up to 100° C.

The final temperature of the water is preferably in the range of 30° C. to 90° C., which temperature may be obtained by preheating the water and/or by the energy dissipated by the stirrer during the process of dispersion.

In this way a stable colloidal suspension of granule fragments of the water-insoluble hydrophobic starch derivative is obtained. The average size of the granule fragments is in the range of 1 micron to 0.1 micron, as determined by turbidity measurements in a Beckman spectrophotometer at 3750, 4500, 5000 and 5500 A. This method gives a weight average size. Particles somewhat larger than 1 micron, e.g. 3 micron, or smaller than 0.1 micron may be present.

These colloidal suspensions obtained by redispersing the products of the invention in water have the same physical properties, e.g. film-forming properties as the original suspension which was subjected to the heating and drying process. They may be applied as binder in paper coating colors, in which case a weight average size of about 0.1 to 0.4 micron is preferred. For other applications, such as a binder in non-wovens, suspensions with granule fragments of a weight average size of about 0.5 to 1 micron are preferred.

The following examples illustrate the invention.

EXAMPLE 1

Corn starch is etherified in aqueous suspension with benzyl chloride to a granular benzyl ether of starch having a DS of 0.26. This is accomplished by making a suspension of corn starch in an aqueous solution of 20% by weight of sodium sulfate and adding in increments sodium hydroxide and benzylchloride, while maintaining the reaction temperature at 50° C.

The total amount of benzyl chloride added equals 30% of the starch solids and the total reaction time is approximately 90 hours. The reaction mixture is neutralized and filtered and the product is washed and dried. The hydrophobic starch ether cannot be dispersed by cooking at atmospheric pressure. When a 30% aqueous suspension is passed through a continuous pressure cooker at 140° C., a stable colloidal suspension of sub-micron sized particles (weight average particle size 0.25–0.30 micron) is obtained. The hot fresh suspension is dried on a rotating drum drier making 3 r.p.m. and heated to a temperature of approx. 135° C. The thin film thus obtained is comminuted to flakes by milling it so as to pass through a 40 mesh screen.

The dry product can be redispersed in water of room temperature by stirring with a Pendraulic stirrer at 4200 r.p.m. for 2 minutes.

The temperature is raised to 35° C. as a result of the energy dissipated by the stirrer. The weight average size of the colloidal granule fragments is about 0.25 micron. It is also possible to disperse the starch ether in water by stirring by hand, the temperature of the water having beforehand been raised by heating to approximately 85° C. The suspensions thus obtained are, after addition of 20% glycerol, cast on Pliofilm, using a blade with an opening of 0.5 mm. The suspensions form smooth and clear films of approx. 0.1 mm. thickness. The tensile strength of the films climatized for 24 hours at 20° C. and 65% RH is 0.96 and 1.03 kg./mm.$^2$, whereas a film cast from the original continuous cooker dispersion to which the same percentage of glycerol is added has a tensile strength of 0.90 kg./mm.$^2$.

The suspension made with the high energy stirrer at room temperature is used as a binding agent in a coating color for paper. The coating color has 53% dry substance and contains 20% of starch derivative based on the weight of the china clay pigment. The coating color thus obtained gives coated paper with similar properties as are obtained when the suspension coming directly from the continuous cooker is used as a binder. The water resistance, pick and ink absorption are of equal values in both cases.

EXAMPLE 2

The granular starch benzyl ether having a DS of 0.26 described in Example 1 is cooked with water in a pressure cooker for 30 minutes at 160° C. while strring. The suspensing thus obtained contains particles of which the weight average size is 0.8 micron. This suspension is immediately dried on a heated drum at 4 r.p.m. and at a temperature of 150° C.

The dry film is comminuted to small flakes. These can easily be redispersed in water of room temperature with a high energy stirrer, thus giving a stable suspension which contains particles of the starch derivative having a weight average size of 0.4 micron. This suspension is a very good sizing agent for polyacrylonitrile yarn.

EXAMPLE 3

A benzyl ester of starch with DS 0.19 is cooked with water in a continuous pressure cooker at 160° C., thereby giving a colloidal suspension with a weight average particle size of 0.3 micron. When the hot suspension is dried in a thin layer on a heated drum dryer at a temperature of 160° C. a dry product may be obtained which after grinding can easily be dispersed in water of 50° C. using a normal laboratory stirrer. The weight average size of the particles in the suspension is 0.3 micron. This stable aqueous colloidal suspension is a suitable binder in coating colors for paper.

EXAMPLE 4

The 30% aqueous suspension made in the continuous pressure cooker as described in Example 1 is diluted with hot water to a concentration of 20% and this suspension is dried in a spray drier, the air inlet temperature being 180° C. and the outlet temperature about 75° C.

A granular powder is obtained having 5% moisture, which is sieved through a 40 mesh screen.

This dry powder can be dispersed in water, for instance by adding 20 parts of the powder to 80 parts of water of 25° C., while stirring for 3 minutes with a high energy stirrer at 4200 r.p.m., whereby the temperature of the water is raised to 38° C. A stable colloidal suspension of subgranule particles is thus obtained having a weight average size of about 0.5 microns. The colloidal suspension is very useful as a binder for non-woven.

I claim:
1. A process for the manufacture of dry hydrophobic starch derivatives which are dispersible in water at a temperature ranging from ambient temperature up to 100° C. to provide a stable colloidal aqueous suspension which comprises dispersing a water-insoluble granular hydrophobic starch derivative containing ether-linked or ester-linked hyrophobic groups selected from aliphatic groups of 3 to 17 carbon atoms, alicyclic groups of 6 to 12 carbon atoms and aromatic groups of 6 to 12 carbon atoms and having a degree of substitution of 0.1 to 1.0 in water at a concentration of 10% to 50% by weight at temperatures in excess of 100° C. and heating and simultaneously drying the suspension so obtained in less than 60 seconds at a product temperature of between 60° C. and 180° C. and comminuting the dried product to flakes or powder.

2. A process according to claim 1 in which the suspension is rapidly heated and dried in a thin layer on a rotating drying drum which is heated at a temperature of between about 100° C. and about 180° C. and makes at least one rotation per minute after which the dried product is comminuted to flakes.

3. A process according to claim 1 in which the suspension is rapidly heated and dried in a spray drier at gas inlet temperature of 150° C. to 350° C. after which the dried product is comminuted to powder.

4. A process according to claim 1 in which the hydrophobic starch derivative is selected from the group consisting of benzyl starch, benzoyl starch and starch phenyl carbamate.

References Cited

UNITED STATES PATENTS

| | | | |
|---|---|---|---|
| 2,853,484 | 9/1958 | Lolkema et al. | 260—233.3 |
| 3,086,890 | 4/1963 | Sarko et al. | 127—69 |
| 3,555,008 | 1/1971 | Johnson | 260—233.3 |
| 1,901,109 | 3/1933 | Maier | 127—71 |
| 3,484,433 | 12/1969 | Bridgeford | 260—233.3 |
| 2,732,309 | 1/1956 | Kerr | 106—213 |
| 3,127,392 | 3/1964 | Fisher et al. | 260—233.3 |

OTHER REFERENCES

Whistler, et al., Starch: Chemistry and Industry, vol. II, pp. 524 to 527, 1967. TP 415W4.

DONALD E. CZAJA, Primary Examiner

M. I. MARQUIS, Assistant Examiner

U.S. Cl. X.R.

106—214; 117—139.5 C, 143 R; 127—71; 260—2.5 AS, 233.3 A, 233.3 R, 233.5